United States Patent Office 3,297,774
Patented Jan. 10, 1967

3,297,774
PREPARATION OF DIACETYLENE FROM DIACETYLENIC GLYCOL
Robert J. Tedeschi, Whitehouse Station, and Arthur E. Brown, Summit, N.J., assignors to Air Reduction Company, Incorporated, New York, N.Y., a corporation of New York
No Drawing. Filed Apr. 30, 1964, Ser. No. 364,021
4 Claims. (Cl. 260—678)

This invention is concerned with diacetylene and is more particularly concerned with a novel process for the preparation of diacetylene in high yields.

Diacetylene, i.e. the compound having the formula HC≡C—C≡CH, is a highly reactive compound which is useful for the synthesis of a wide variety of acetylenic compounds and less saturated derivatives as described, for example, on pages 305 to 309 of "Acetylene and Carbon Monoxide Chemistry," by John W. Copenhaver and Maurice H. Bigelow (Reinhold Publishing Corp., New York, 1949).

The presently accepted method of preparing diacetylene involves the dehydrohalogenation of 1,4-dichlorobut-2-yne with either sodium hydroxide or sodamide in liquid ammonia. The latter method utilizes three moles of sodamide per mole of dichloride and forms the disodium diacetylide in situ, while the former method yields free diacetylene in 60% conversion.

Although the base-catalyzed cleavage of 1,4-acetylenic diols to acetylene is known, the cleavage of 2,4-diyne-1,6-diols to dicetylene and ketone has been considered only by Zalkind and Aizikovich (J. Gen. Chem., U.S.S.R., vol. 9, 961–4, 1939). In their cursory investigation, they employed large amounts of alkali metal carbonates, and alkaline earth hydroxides and obtained from 2,7-dimethyl-octa-3,5-diyne-2,7-diol low conversions to diacetylene, as wel as the semi-cleavage product, 2-methylhexa-3,5-diyne-2-ol:

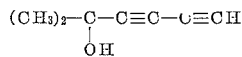

It is an object of this invention to provide a novel process for preparing diacetylene in high yields and without the need for large amounts of reaction agents or catalysts.

We have made the discovery that 2,4-diyne-1,6-diols can be easily and efficiently converted to diacetylene in high yields by treating the diols while dissolved in an inert aromatic hydrocarbon solvent having a boiling point of at at least 100° C. such as xylene, with a very small catalytic amount of sodium hydroxide or potassium hydroxide.

Thus, in accordance with the invention, a 2,4-diyne-1,6-diol having the formula

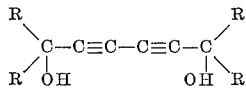

wherein each R is a lower alkyl radical, i.e. having 1 to 6 carbon atoms, is dissolved in a hydrocarbon solvent of the character indicated and is heated at a temperature of about 80° C. up to the boiling point of the solvent in the presence of about 0.2 to 3 grams of sodium hydroxide or potassium hydroxide per gram-mole of the 2,4-diyne-1,6-diol, preferably 0.7 to 1.3 grams per gram-mole. The catalyst is employed in solid substantially anhydrous form and the reaction is carried out in an inert atmosphere, e.g. a nitrogen atmosphere.

The 2,4-diyne-1,6-diol which is cleaved in accordance with this invention is readily obtained from the corresponding acetylenc carbinol by known means, e.g. by treatment with aqueous cuprous chloride and ammonium chloride in the presence of oxygen, as described in "Acetylenic Compounds in Organic Synthesis" by R. A. Raphael (Academic Press, Inc., New York, 1955), pp. 127–128, and the carbinol is, in turn, effectively produced by known means from acetylene and a ketone, as described in Tedeschi et al., U.S. Patent 3,082,260. The preparation of 2,7-dimethylocta-3,5-diyne-2,7-diol and its conversion to acetylene by the process of this invention can be illustrated by the following equations:

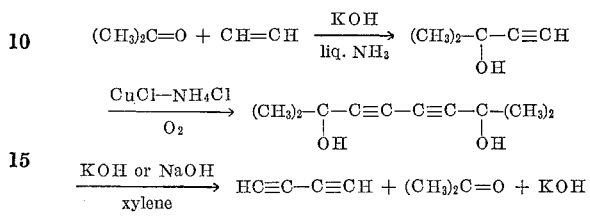

We have found that, surprisingly, the catalyzed cleavage of 2,4-diyne-1,6-diols is highly dependent upon the concentration of the sodium or potassium hydroxide used as catalyst, as shown below, the quantity of catalyst in the following table being in grams per gram-mole of the diyne-diol:

| Base | Amount | Percent Conversion to— | |
|---|---|---|---|
| | | Diacetylene | Ketone |
| KOH | 0.2 | 0 | 0 |
| KOH | 0.7 | 74 | 88 |
| KOH | 1.0 | 71 | 80 |
| NaOH | 1.3 | 80 | 83 |
| KOH | 2.3 | 61 | 83 |

Amounts of potassium hydroxide greater than about 2.3 g./mole result in increased amounts of dark, polymeric residues and lower diacetylene conversions. Sodium hydroxide, however, yields less polymer and higher diacetylene conversions at equivalent concentrations. The above-noted diacetylene conversions are minimum values since some of the diacetylene complexes with or dissolves in the ketone as it is condensed. Diacetylene, however, can be separated from ketone solutions, e.g. acetone solutions, by water scrubbing, as described in Dunn U.S. Patent 2,941,-020, if higher conversions are required.

Xylene is the preferred solvent for the reaction since it is a particularly good solvent for the diyne-diol at 80–100° (all temperatures herein are in ° C.) and, while refluxing on the sides of the reaction vessel, minimizes sublimation. It also does not complex strongly with diacetylene, thereby allowing the latter to have a short residence time in the cleavage medium, which in turn minimizes polymerization. However, other aromatic solvents such as toluene, ethyl benzene, mesitylene, and the like, can be employed as long as the solvent is liquid at 0°.

Diacetylene polymerizes rapidly above 0°, and in the presence of air can be readily detonated in vapor concentrations of 20–25% by a suitable ignition source.

For this reason, the cleavage is carried out, as indicated, in an inert atmosphere, such as an atmosphere of nitrogen, and the diacetylene, if not used immediately, is suitbly rapidly condensed and stored below −30°. An important advantage of the method of this invention is that small amounts of diacetylene can be generated and used as needed, using the stable diyne-diol as starting material. In this way the hazardous storage of diacetylene for prolonged periods of time can be avoided. In fact, it is possible to lead the evolved gas directly into the desired reaction medium. In any case, it is preferable that the diacetylene be used within several hours after preparation.

If diacetylene, either as the pure liquid (B.P. 10.3°) or in organic solutions, is allowed to stand at 0° or above for more than one hour, pronounced darkening, followed by the rapid precipitation of polymer, is observed. At 10° the discoloration is rapid, and solutions containing 10% diacetylene in acetone or xylene will set to a porous gel on standing overnight. However, no discoloration or polymer formation was noted for diacetylene stored at −20° to −35° under nitrogen for four hours. Polymer derived from diacetylene has been found to be stable to impact, friction and slow heating, and when thrown on a hot plate at 200° disappears quietly in a puff of smoke. Attempts to stabilize solutions of diacetylene with chemical inhibitors such a pyridine, hydroquinone, phenyl-$\beta$-naphthylamine or diphenyl picrylhydrazyl are generally ineffective. The best inhibitor system is refrigeration below −30° and the careful exclusion of air. A sample of diacetylene which had been stored, in one instance, over the weekend at Dry Ice temperature in the absence of a nitrogen blanket, on redistillation decomposed in the distillation vessel with a mild explosion and the formation of much finely divided carbon. It is believed unstable peroxides were the cause.

Using the conditions described for the cleavage process of this invention, no significant amounts of the partial diyne-ol cleavage product, e.g. 2-methylhexa-3,5-diyn-2-ol, are obtained. However, this diyne-ol derivative can be obtained in impure condition in 52–56% conversions, together with 30–38% diacetylene, by cleavage in the presence of sodium or potassium carbonates (0.20 g. carbonate per 0.10 mole diyne-diol) using mineral oil (Nujol) as solvent. This high boiling product (137°/70 mm.) is relatively unstable and polymerizes both during and after distillation. It has been noted that a sample in a vial expanded on polymerizing to a hard dark red-brown glossy mass and cracked the vial.

The objects and features of the invention will be more readily apparent from the following detailed examples of the preparation of diacetylene from 2,7-dimethylocta-3,5-diyne-2,7-diol.

Example 1

The diyne-diol employed was prepared by the oxidative coupling of 3-methyl-1-butyn-3-ol in aqueous solution, using a catalytic amount of cuprous chloride solubilized by excess ammonium chloride, as described in "Acetylenic Compounds in Organic Synthesis." The diyne-diol is sparingly soluble in water, and was readily freed of cuprous chloride by washing with concentrated ammonium chloride solution, then water, followed by recrystallization from xylene, and air drying. The diyne-diol, if not recrystallized, should be clarified with activated carbon (Nuchar) and filtered in hot xylene solution (commercial ortho, para mixture) from residual copper salts to avoid the later possibility of forming copper diacetylene complexes or acetylides which may initiate the exothermic decomposition or polymerization of diacetylene.

The apparatus for carrying out the base cleavage of the invention and the separation of diacetylene from xylene and acetone consisted principally of a decomposition flask, an acetone-xylene condensation receiver, and a graduated diacetylene trap arranged in series.

The decomposition flask was a 500 cc., 29/42 standard taper, three necked flask equipped with a thermometer well or joint. One neck was equipped with a gas inlet tube for introduction of nitrogen, while the furthest neck was equipped with a ten inch Vigreux column (29/42 joints, one inch diameter, O.D.). The middle neck was equipped with a stirrer, with a mineral oil seal to minimize possible loss of diacetylene. The top of the Vigreux column was provided with a standard distillation head, in which acetone was condensed (water cooling below 25°) yet the major part of the evolved diacetylene was allowed to be swept into the diacetylene trap.

The condensation receiver was a 250 cc., three necked flask equipped with a half inch (O.D.) delivery tube leading from the distillation head into the receiver. The furthest neck of the receiver was fitted with a ten inch packed (stainless steel ¼ inch Podbielniak or protruded packing) column, the top of which was equipped with a total return condenser for acetone, but allowed diacetylene gas to be collected in the diacetylene trap. The receiver was kept at a temperature 55–60° to minimize diacetylene solubility in the acetone.

Diacetylene-nitrogen gas lines (¼ inch I.D. Pyrex) led from the distillation head and from the total return condenser of the condensation receiver met at a T-connection prior to leading into the diacetylene trap. This trap (one inch I.D.) was graduated to 0.20 cc. accuracy and had a capacity of about 50 cc. It was equipped with an entrance tube ending approximately at the 20 cc. mark, and an exit tube which could be used to vaporize the diacetylene slowly under a slow nitrogen current into a reactor containing an appropriate solvent. The trap was cooled to approximately −50 to −70° by the use of Dry Ice and alcohol, and by immersing the trap up to the 20 cc. mark. However, care was exercised to avoid freezing (−36°) the diacetylene in the entrance line and causing a plug. The bath was lowered somewhat if crystallization was noted, but otherwise a bath temperature of −30 to −35° could be used safely for several hours.

The generation of diacetylene was started by first adding to the decomposition flask 100 cc. xylene, 0.10 mole (16.6 g.) 2,7-dimethylocta-3,5-diyne-2,7-diol, and 0.10 g. powdered 90–98% potassium hydroxide. The reaction system, previously well purged with nitrogen, was now purged again with nitrogen for 10 minutes using a moderate flow through a mineral oil bubble counter. The reaction slurry was stirred at a speed sufficient to maintain good mixing, without splashing, as the reaction slurry was heated.

As the reaction temperature approached 90° some gradual volatilization of acetone and diacetylene was noted. With the use of constant heat input, the reaction temperature rose to 92–94° and then fell to 87–88°, whereupon active distillation of both acetone and diacetylene was observed. When approximately 50% (by volume) of the expected amounts of products had been collected, the rate of distillation decreased as the reaction temperature increased. By the time the boiling point of xylene (139°) was reached, distillation of acetone and condensation of diacetylene had essentially ceased. The acetone collection chamber was kept at 60° to minimize solubility of diacetylene in acetone. Both the decomposition flask and the condensation receiver were swept with slow currents of nitrogen during the cleavage and for fifteen minutes after heating was halted. The conversion to diacetylene was measured directly by noting the volume of liquefied gas ($d_4°$ 0.7364) or by weighing the cold tarred trap. The diacetylene collected on redistillation left no residue and boiled at 9–10°.

The physical constants of diacetylene are: B.P. 10.3° (760 mm.); M.P. −36 to −35°; $d_4°$ 0.7364, vapor pressure (mm.): 1.6 (−78°); 93.5 (−35.5°); 519 (0°).

Example 2

The reaction described in Example 1 was repeated except that 0.10 g. of powdered 90–98% sodium hydroxide was employed instead of potassium hydroxide. Equivalent results were obtained.

As previously mentioned, the diacetylene is best used soon after preparation. However, if the diacetylene is stored overnight, it should be cooled to −70 to −80° and stored under a nitrogen atmosphere. Exposure to air and alkali must be avoided at all times, and a safety face shield should be worn when handling this material. A well-ventilated hood with a sliding glass or Plexiglas window should be used. Thus, as previously mentioned, the diacetylene can be led directly into a reaction vessel as it is produced or, after it has been stored, by vaporizing it slowly, using a current of nitrogen and a water bath at 5–10°. Useful solvents for dissolving diacetylene and for carrying out reactions with it are methylal, dioxane, liquid ammonia, N-methyl pyrolidone, and dimethyl sulfoxide.

It will be understood that various changes and modifications may be made without parting from the scope of the invention, as defined in the appended claims and it is intended, therefore, that all matter contained in the foregoing description shall be interpreted as illustrative only and not as limitative of the invention.

We claim:
1. A method of preparing diacetylene which comprises treating a compound of the formula

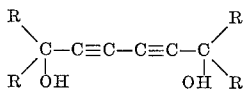

wherein each R is a lower alkyl radical, with a catalyst selected from the group consisting of sodium hydroxide and potassium hydroxide, in an aromatic hydrocarbon which is liquid at 0° C. and has a boiling point above 100° C.

2. A method as defined in claim 1, wherein the reaction mixture is heated to a temperature of at least about 80° C.

3. A method as defined in claim 1, wherein said catalyst is present in the amount of 0.2 to 3 grams per gram-mole of said compound.

4. A method as defined in claim 3, wherein the reaction mixture is heated to a temperature of at least about 80° C.

References Cited by the Examiner

UNITED STATES PATENTS

| | | | |
|---|---|---|---|
| 2,455,677 | 12/1948 | Horeczy | 260—678 |
| 3,065,283 | 11/1962 | Happel et al. | 260—678 |
| 3,166,605 | 1/1965 | Wotiz et al. | 260—678 |

FOREIGN PATENTS

| | | |
|---|---|---|
| 1,052,759 | 9/1953 | France. |

ALPHONSO D. SULLIVAN, *Primary Examiner.*